(12) United States Patent
Winell

(10) Patent No.: US 6,625,145 B1
(45) Date of Patent: Sep. 23, 2003

(54) USE OF LOWER IP-ADDRESS BITS

(75) Inventor: Staffan Winell, Askim (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/222,767

(22) Filed: Dec. 30, 1998

(51) Int. Cl.[7] .............................................. H04L 12/56
(52) U.S. Cl. ...................... 370/389; 370/328; 370/338; 370/392; 370/401; 370/402; 370/403; 370/404; 370/475; 709/226; 709/223; 709/220; 709/245
(58) Field of Search ................................ 370/328, 338, 370/389, 392, 401–404; 709/226, 223, 220, 245

(56) References Cited

U.S. PATENT DOCUMENTS

| | | | | |
|---|---|---|---|---|
| 5,159,592 A | * | 10/1992 | Perkins ....................... | 370/85.7 |
| 5,442,633 A | | 8/1995 | Perkins et al. ............. | 370/94.1 |
| 5,526,489 A | * | 6/1996 | Nilakantan et al. .... | 395/200.02 |
| 5,533,026 A | * | 7/1996 | Ahmadi et al. ............ | 370/94.1 |
| 5,621,727 A | | 4/1997 | Vaudreuil ..................... | 370/60 |
| 5,673,263 A | | 9/1997 | Basso et al. ................. | 370/396 |
| 5,708,655 A | | 1/1998 | Toth et al. ................... | 370/313 |
| 5,793,762 A | | 8/1998 | Penners et al. ............. | 370/389 |
| 5,793,763 A | | 8/1998 | Mayes et al. ................ | 370/389 |
| 5,796,728 A | | 8/1998 | Rondeau et al. ............ | 370/338 |
| 6,061,739 A | * | 5/2000 | Reed et al. .................. | 709/245 |
| 6,310,893 B1 | * | 10/2001 | Yuan et al. ................. | 370/474 |

OTHER PUBLICATIONS

W.Richards Stevens, TCP/IP Illustrated, vol. 1, The Protocol: Internet Address (pp. 7–9), 1994, published by Addison–wesley Publishing Company.*

Cohen, D., et al., "IP Addressing and Routing in a Local Wireless Network", One World Through Communications, Florence, May 4–8, 1992, vol. 2, No. Conf. 11, Jan. 1, 1992, pp. 626–632, XP 002020138.

Johnson, J.T., "IP Addresses: Easing the Crunch", Data Communications, vol. 24, No. 1, Jan. 1, 1995, pp. 76, 78, & 80, XP 000480812.

"Personal Digital Cellular Telecommunication System ARIB Standard", RCR STD–27F, pp 189–190.

* cited by examiner

Primary Examiner—Douglas Olms
Assistant Examiner—Van Nguyen

(57) ABSTRACT

The present invention provides a method and system in which the lower address bits of an IP address are used as a mobile station's short identifier. According to exemplary embodiments of the present invention, the operator of a MSC/PMSC node is normally assigned, from an ISP, several class C-networks to provide to its packet mobile subscribers. When these networks are chosen with the same high order bits, as is most often the case, it is possible to directly map the lower bits of the IP-address to a unique key value that could be used within the node. For a PPDC-node, this key value can be used as a short mobile station identifier in the LAPDm protocol. For other data-link protocols on other platforms, it is also possible to use the new key value as a short identifier for the mobile station. Therefore, the translation process turns simply into a matter of adding or removing the high order bits in order to convert the IP address into the mobile station identifier.

13 Claims, 5 Drawing Sheets

FIG. 3 "PRIOR ART"

USE OF LOWER IP-ADDRESS BITS

BACKGROUND

The present invention relates generally to radiocommunication systems and, ore particularly, to techniques and structures for using the lower bits of an IP address as a mobile station identifier in order to facilitate packet data transfers.

The growth of commercial communication systems and, in particular, the explosive growth of cellular radiotelephone systems, have compelled system designers to search for ways to increase system capacity without reducing communication quality beyond consumer tolerance thresholds. At the same time usage of mobile communication equipment for transmission of data rather than speech has become increasingly popular by consumers. The possibility to send and receive electronic mail and to use a web browser to obtain world-wide-web access is frequently discussed as services that are desirable for wireless communication systems. As a response to this, communication system designers search for ways to efficiently transfer data information to and from mobile users.

There are fundamental differences between requirements for data communication and e.g., speech communication. For example, delay requirements are higher for speech, which is a real time service, and the error requirements are higher for data communications, while the delay constraints are lower. The use of packet data protocols, which are more suitable for transmission of data than circuit switched protocols, has started to find its way into cellular communication systems. Packet service integration in both Global System for Mobile communication (GSM) cellular systems as well as Digital Advanced Mobile Phone System (DAMPS) cellular systems is presently being standardized.

Today, GSM systems provide a circuit switched data service, which can be used to interconnect with external data networks. The circuit switched data service is used for both circuit switched as well as packet switched data communication. To make packet switched data communication more efficient, a new packet switched data service called General Packet Radio Services (GPRS) has been introduced as a part of GSM. GPRS will allow for packet switched communication (e.g., IP or virtual circuit switched communication). GPRS will support both a connectionless protocol (e.g., IP) as well as a connection-oriented protocol (X.25). One of the advantages with a packet switched data communication protocol is that a single transmission resource can be shared between a number of users. Thus, in the case of e.g., a GSM cellular system, a timeslot on a radio frequency carrier can be utilized by several mobile users for reception and transmission of data. The shared transmission resource is managed by the network side of the cellular system both for downlink and uplink transmissions.

GPRS is a GSM service and parts of the GSM infrastructure will be used. Those parts of the GSM communication system are described in European Telecommunication Standard Institute (ETSI) document ETS 300 574 which is expressly incorporated by reference herein.

FIG. 1 illustrates a block diagram of an exemplary cellular packet data system. As illustrated, the exemplary cellular system includes a plurality of mobile stations (MS) $100_1$–$100_N$ which communicate with base station (BS) 110. The base station 110 is connected to a Mobile Switching Center/Packet Mobile Switching Center (MSC/PMSC) 120 which in turn is connected to the operator's backbone network 140 through router 130. A router, as will be appreciated by one skilled in the art, is a piece of hardware which operates at the network layer to direct packets between various nodes of one or more networks. The operator's backbone network 140 is connected to a host 170, which is located on an Internet Service Provider's (ISP's) external Internet Protocol (IP) network 160, through router 150. One skilled in the art will appreciate that the number of components provided in FIG. 1 is provided merely by way of example and that a typical packet data network generally includes a plurality of base stations, MSC/PMSCs, etc. Moreover, a typical packet data network would also include a firewall (not shown) which protects a local network from external threats, such as hackers. It will be further appreciated that the MSC and PMSC could be provided as a single node, as illustrated, or as separate nodes.

The MSs $100_1$–$100_N$ will typically send packets to locations both within its private network 140 and on the Internet 160. In order to receive packets from the Internet 160, a MS needs a globally unique 32-bit IP address. Each such address has a four octet format which is generally expressed in a dotted decimal point format, with each octet written as a decimal integer separated from other octets by decimal points (e.g., 147.117.45.123).

Global IP addresses are issued according to one of three commonly used classes. Class A IP addresses employ their first octet as a network identifier and their remaining three octets as a host identifier. Since three octets are available for specifying a particular host, an enterprise having class A addresses has nearly $2^{24}$, or nearly 17 million, addresses at its disposal for use with possible hosts. Class B IP addresses, on the other hand, employ their first two octets to identify the network and their second two octets to identify a particular host. Thus, an enterprise having class B addresses can use those addresses to identify approximately 64,000 hosts. Finally, class C IP addresses employ their first three octets to identify the network and their last octet to identify a host. As such, only 256 host addresses are available to enterprises having a single class C network identifier.

In the system of FIG. 1, the operator of the MSC/PMSC 120 generally has a plurality of IP networks which can be accessed by the MSs. As discussed above, class B and C networks provide the operator with the greatest number of available network identifiers, and therefore, the greatest number of possible networks which can be provided to the MSs. A typical class C network may have the following IP addresses at its disposal:

| 194.52.10 Net address | Local address |
|---|---|
| 194.52.54 Net address | Local address |

The local (i.e., host) address part is only 8 bits in class C networks. In the example above, this enables the MSC/PMSC operator to service 44*256 MSs for IP-communications. As will be appreciated by one skilled in the art, the router 130 and the MSC/PMSC 120 must be configured at installation in such a way so as to allow IP-addresses, which have been assigned to the MSs, to be routed correctly.

FIG. 2 illustrates a simplified block diagram of the exemplary network set forth in FIG. 1 in order to describe the process by which a mobile station, for example MS $100_1$, communicates with the host 170. The ISP's IP network 160, the operator's backbone network 140, and routers 130, 150 of FIG. 1 are illustrated as a single IP network with routers 260 in the simplified block diagram. In order for the mobile station 1001 to communicate with host 170, the mobile station must first register with the MSC/PMSC 120. This registration process is simply a log-in process and is accomplished by the MS 1001 transmitting its unique long identifier to the MSC/PMSC 120 to request an Internet packet session. In turn, the MSC/PMSC 120 assigns the MS 1001 a globally unique IP-address from a pool of addresses kept by the node (i.e., the MSC/PMSC). The MSC/PMSC 120 may also assign, as will be discussed in more detail below, a short mobile station identifier.

As illustrated, the MSC/PMSC 120 comprises a memory 222 for storing local data for each mobile station that the MSC/PMSC 120 is servicing. This local data includes, among other things, protocol state variables and aids in the packet transmission process. The local data is referenced by either the mobile station's unique long or short identifier or the unique IP address which has been assigned to the mobile station for the current packet data session.

After successful registration of the mobile station with the node, IP-traffic is permitted to flow between the MS 1001 and IP-host 170 via the node 120. When the MS 1001 thereafter communicates with the host 170, the node 120 translates the mobile station's unique identifier, whether long or short, to the assigned IP-address on the uplink and the IP-address to the mobile station's unique identifier on the downlink. This translation is normally performed for each packet via a hash function and leads to data records where the translation is found together with other MS "state" local data. This state local data includes, among other things, internal routing information for the IP-packets.

One skilled in the art will appreciate that communications to and from the mobile station can be performed using a shorter identifier that has been negotiated during the registration process. In a Packet Personal Digital Cellular (PPDC) system, for example, this shorter identifier is called a Short Mobile Station Identifier (SMSI) and is assigned by the LAPDm protocol. The SMSI is transmitted, along with the mobile station's long identifier, to the mobile station in a special message from the PPDC node. PPDC systems, including the use of SMSIs, are described in more detail in Personal Digital Cellular Telecommunication System, ARIB Standard RCR-27F which is expressly incorporated by reference herein. In such systems, a PPDC node assigns a mobile station a unique short identifier from a range of identifiers. The use of a short identifier, as one skilled in the art will appreciate, reduces channel capacity usage. However, frequent SMSI reassignment may be necessary due to the chance of mobile stations entering the area which have been assigned the same SMSI by another node.

FIG. 3 illustrates a flow chart of a conventional packet communication session between a mobile station and a host on the Internet. In step 300, a mobile station, wanting to transfer one or more data packets to a host on the Internet, first registers with an IP address allocation node by contacting the node using its long mobile station identifier and requesting such a packet data session. In response, the node assigns the mobile station a unique IP address and reserves a local data area in the node for the mobile station. As mentioned above, the local data area is used to keep protocol state variables and buffers, etc. This local data area reservation process can occur during or after the registration process. In addition to the IP address, the node may assign the mobile station a short identifier for use in the packet session. As set forth above, the use of a short identifier leads to a reduction of channel capacity usage.

Once registered, the mobile station transfers a data packet, intended for the host, to the node (step 310). The data packet includes the mobile station's long or short identifier. This is necessary in order for the node to identify from which mobile station the packet is sent. At the servicing node, the mobile station's identifier is translated into the source IP address. This translation operation is generally performed through the use of a hashing algorithm in which a key value is used to reference information in a lookup table which leads to the local data area where the IP-address is stored. The translation operation is performed for every packet transmitted from the mobile station. After the translation process, the node transmits the packet, containing the source IP address, to the host (step 320).

If the host, in response to the reception of the packet, wants to transmit a packet back to the mobile station, the response packet, containing a destination IP address, is transmitted from the host to the node (step 330). At the node, the response packet's IP address is translated back into the mobile station's long or short identifier using a different lookup table than the one used for translating the mobile station's identifier to the IP address (step 340). As with the translation operation described above, this translation operation is performed for every packet that is to be transferred to the mobile station. After the address translation operation, the packet is transmitted to the mobile station (step 350).

It is recognized that the translation process described above is not only time consuming, but also involves the use of complicated programming. Moreover, since two separate lookup tables are used for translating the mobile station identifier to/from the mobile station's assigned IP address, valuable memory space is wasted. In order to overcome these problems, the present invention proposes to facilitate the translation process by assigning a mobile station a short identifier which is set to the lower order bits of the IP address to which the mobile station is assigned.

SUMMARY

The present invention seeks to overcome the above-identified deficiencies in the art by providing a method and system in which the lower address bits of an IP address are used as a mobile station's short identifier. According to exemplary embodiments of the present invention, the operator of a MSC/PMSC node is normally assigned, from an ISP, several class C-networks to provide to its packet mobile subscribers. When these networks are chosen with the same high order bits, as is most often the case, it is possible to directly map the lower bits of the IP-address to a unique key value that could be used within the node. For a PPDC-node, this key value can be used as a short mobile station identifier in the LAPDm protocol. For other data-link protocols on other platforms, it is also possible to use the new key value as a short identifier for the mobile station. Therefore, the translation process turns simply into a matter of adding or removing the high order bits in order to convert the IP address into the mobile station identifier.

BRIEF DESCRIPTION OF THE DRAWINGS

The above objects and features of the present invention will be more apparent from the following description of the preferred embodiments with reference to the accompanying drawings, wherein.

DETAILED DESCRIPTION

Conventional data packet communication methods include translation processes by which a mobile station's identifier is translated into an IP address, and vice versa, through the use of distinct hashing algorithms. These translation processes occur for each packet that is transferred to or from the mobile station. Having two addresses associated with each mobile station (i.e., the mobile station's long address and the IP address) slows the performance of the servicing node and limits the number of mobile stations which the node can handle.

Figure 1:
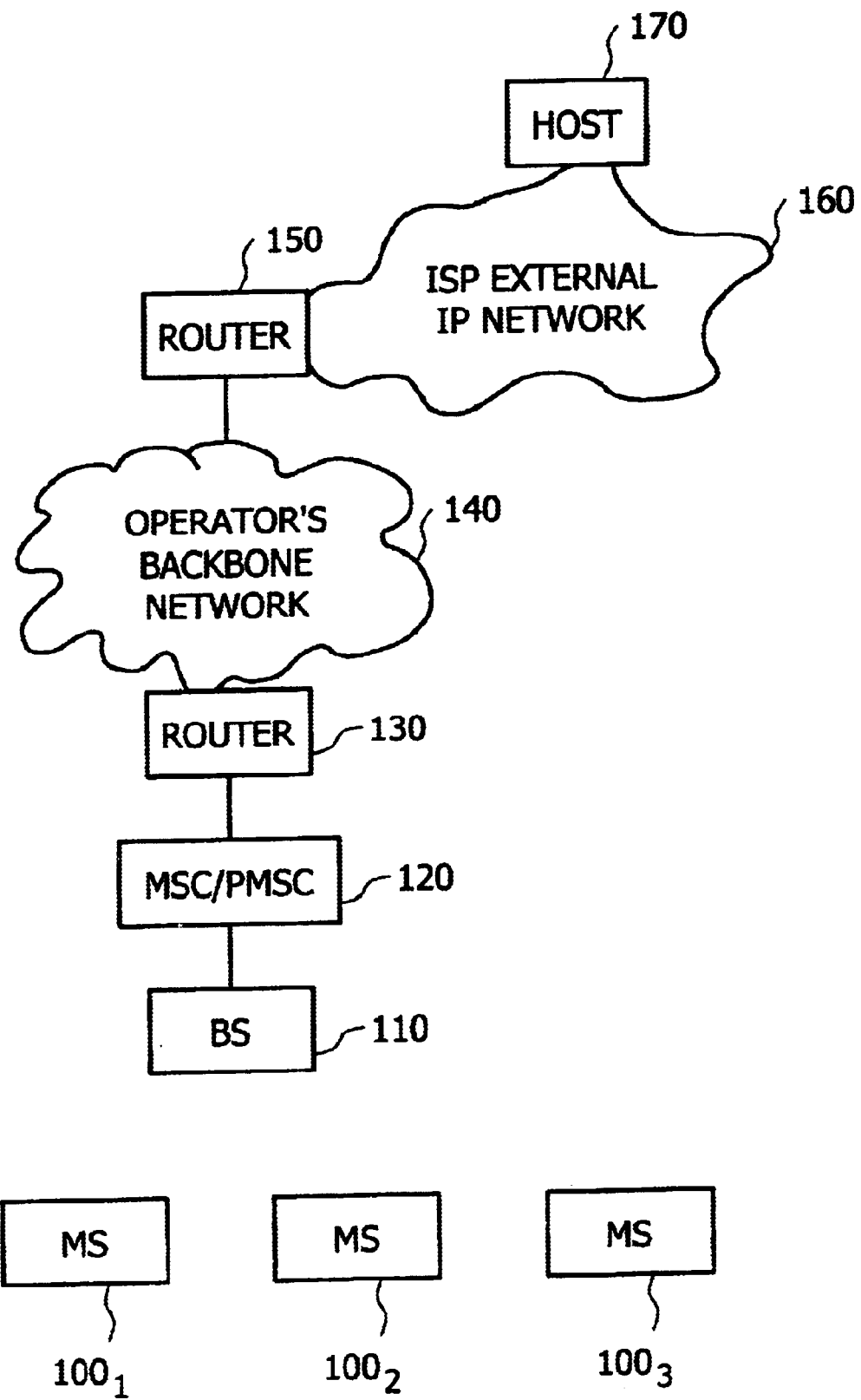
FIG. 1 illustrates a block diagram of an exemplary cellular packet system.
Figure 2:
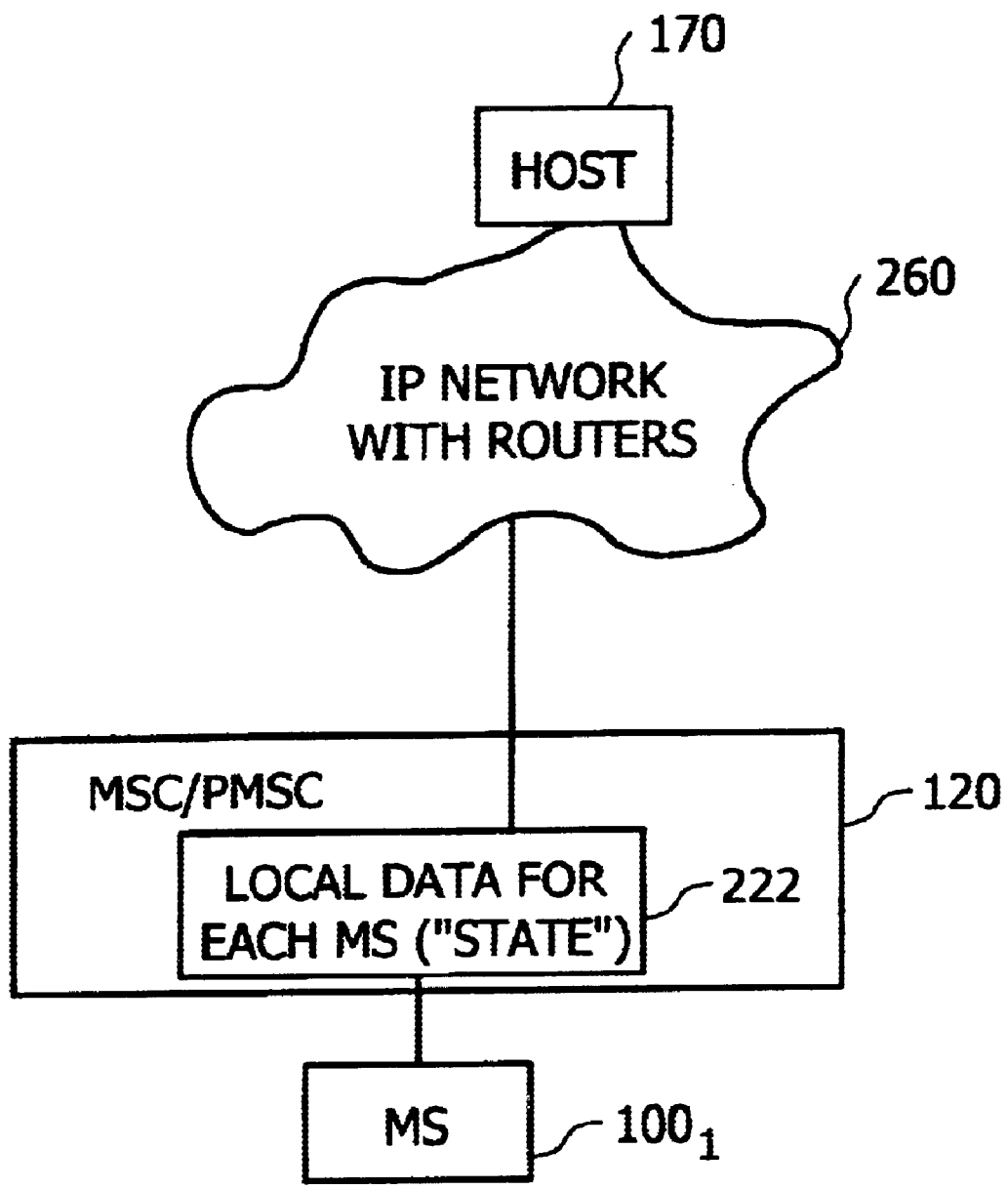
FIG. 2 illustrates a simplified block diagram of the exemplary cellular system set forth in FIG. 1.
Figure 3:
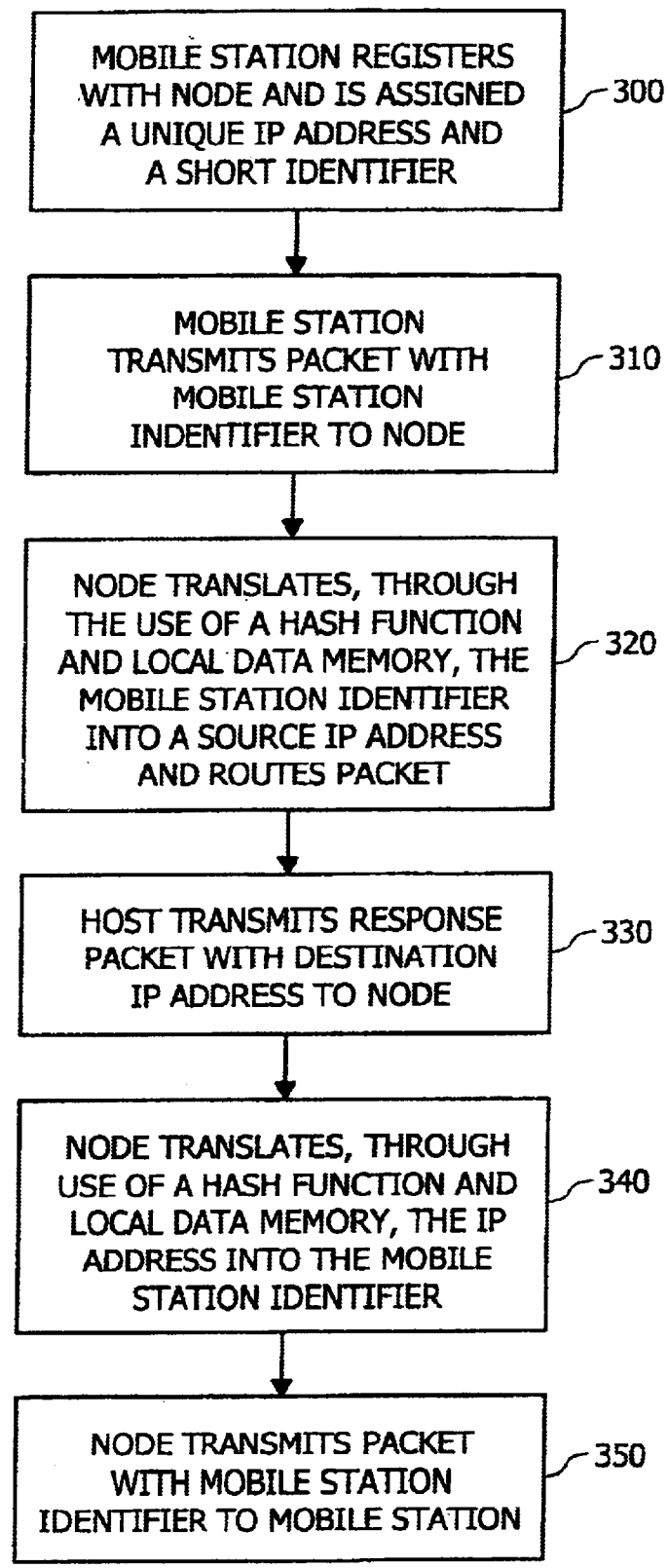
FIG. 3 illustrates a flow chart of a conventional packet communication session between a mobile station and a host on the Internet.
Figure 4:
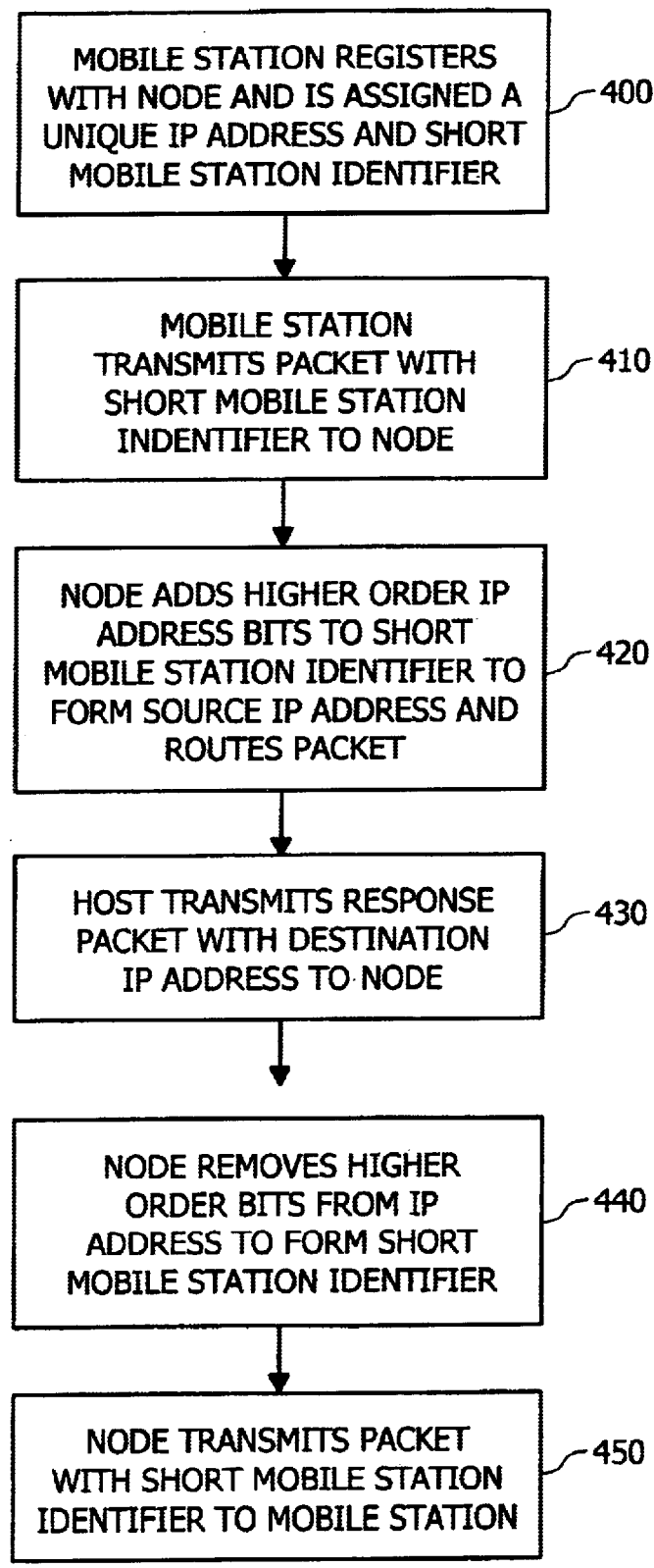
FIG. 4 illustrates a flow chart of an exemplary packet communication session, according to the present invention, between a mobile station and a host on the Internet.

Referring back to the exemplary packet cellular system illustrated in FIG. 2 and the flow chart illustrated in FIG. 4, the data packet communication technique of the present invention is described. In step 400, the mobile station, for example MS 100₁, registers with the MSC/PMSC node 120 by contacting the node using its long mobile station identifier and requesting a packet communication session. As with the conventional technique described above, the node 120 assigns, in response to the request by the MS 100₁, a unique IP address and reserves a local data area for the mobile station. According to the present invention, the node 120 also assigns the MS a short mobile station identifier. This identifier is set to be equal to a predetermined number of lower bits of the IP address.

During configuration of the MSC/PMSC node, a simple software routine detects, when mobile IP-addresses are entered, the bit length (i.e., a number of bits) which can be used to form unique key values from the entered lower bits of the IP-addresses. This information is then forwarded to the software layers within the node. One skilled in the art will appreciate that the MSC/PMSC node may actually consist of several nodes and, in such an event, all nodes should be informed of the unique key values. Thereafter, any mobile station registering with a node is assigned a unique short identifier which has a length equal to the bit length determined during node configuration. Moreover, since the lower order bits of the IP address are assigned as the short mobile station identifier, this bit sequence can be used as a reference key for accessing the local data 222 in the servicing node 120. As such, a common reference key is available for accessing the local data irrespective of whether data packets are being transferred from the mobile station or to the mobile station.

It will be appreciated that, as an alternative to setting the short mobile station identifier equal to the lower order bits of the IP address, the short mobile station identifier could be assigned a value which is a function of the lower order IP address bits. That is, the lower order IP address bits may be modified in some fashion in order to obtain the short mobile station identifier. If such an approach is taken, it is important that the mapping/transformation procedure produce a single unique value (i.e., a value such that a one-to-one relation exists between the lower order IP address bits and the assigned value).

After registering, the MS 100₁ transmits a data packet, which is intended for the host 170, with its assigned short mobile station identifier to the node 120 (step 410). At the node 120, the higher order IP address bits are added to the short mobile station identifier to form the source IP address which has been assigned to that mobile station during the registration process. The packet is then routed to the host 170 (step 420).

If the host 170, in response to reception of the packet, wants to transmit a packet back to the MS 100₁, the response packet, containing the destination IP address, is transmitted from the host 170 to the node 120 (step 430). At the node, the higher order bits of the destination IP address are removed in order to form the short mobile station identifier (step 440). The node then transfers the data packet, comprising the short mobile station identifier, to the MS 100₁ (step 450).

The following example illustrates the benefits of the present invention. It is assumed for this example that a servicing node has been allocated 100 class C networks having the following IP addresses: 194.52.10.0–194.52.109.0. Written in binary form, this gives the range of:

1100 0010 0011 0100 0000 1010 0000 0000

. . .

1100 0010 0011 0100 0110 1101 0000 0000.

As is evident from the range of binary sequences above, the 17 higher order bits are identical over this range. As a result, the 15 lower order bits can be assigned as a mobile station's short identifier.

Figure 5:
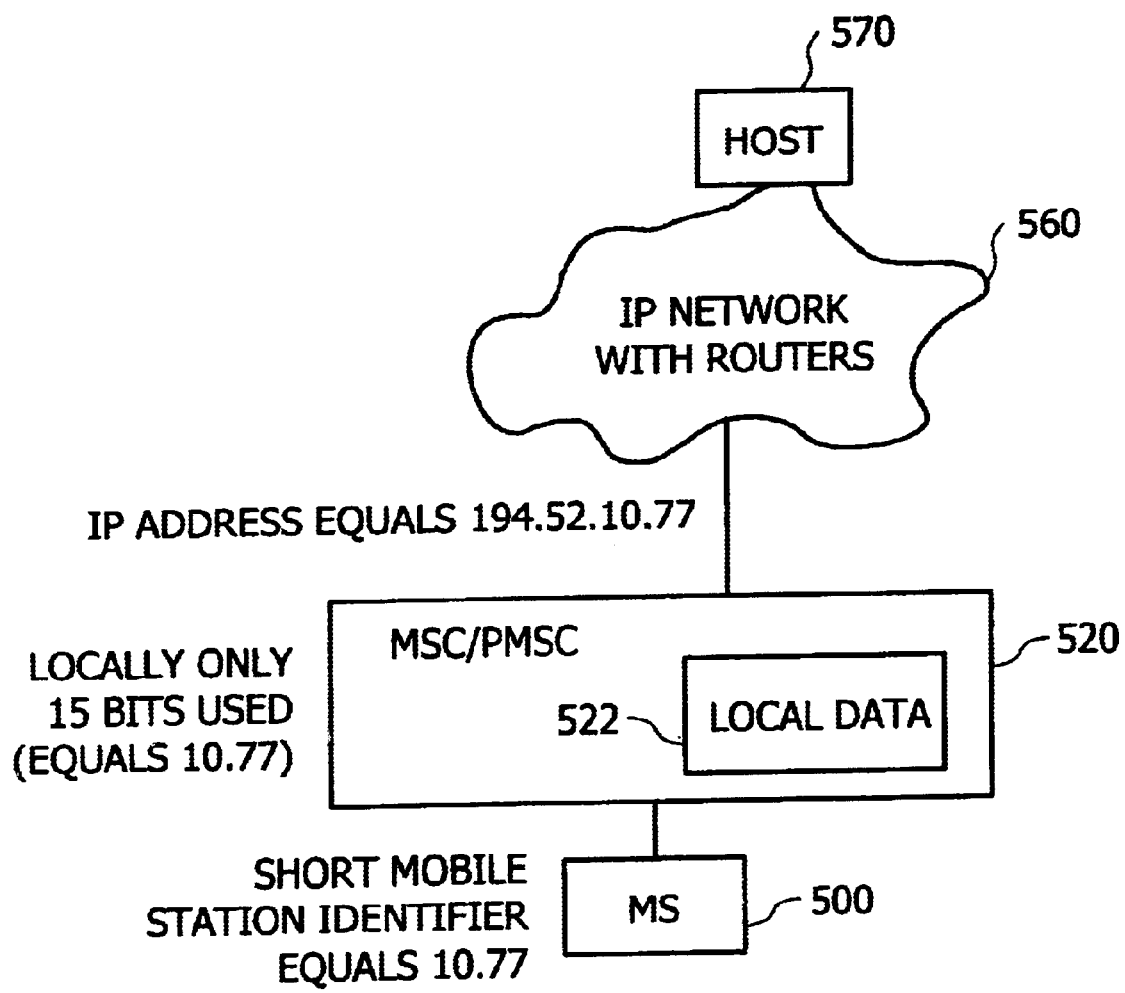
FIG. 5 illustrates a block diagram of an exemplary communication session according to the present invention.

FIG. 5 illustrates an exemplary data packet transfer for the example provided above. In FIG. 5, the mobile station 500 is assigned, during the registration process, an IP address and a short mobile station identifier which is set to the lower 15 bits of the IP address. For this example, assume that mobile station 500 has been assigned an IP address of "194.52.10.77" and, therefore, a short identifier of "10.77". It is this 15 bit identifier (i.e., "10.77") which the MSC/PMSC 520 uses to access the mobile station's local data 522.

In a data packet transfer from the mobile station 500 to the host 570 on the IP network 560, the mobile station 500 transfers, after registering with the node (i.e., MSC/PMSC) 520, a data packet to the node 520. The data packet comprises the mobile station's newly assigned short identifier "10.77". Upon receipt, the node 520 converts this short identifier "10.77" into the IP address "194.52.10.77". This is accomplished by adding the higher 17 bits of the IP address, which, as illustrated in the example above, is identical for all of the class C addresses to which the node has been allotted, to the short identifier. This greatly simplifies the address translation process since the complicated programming associated with the use of different algorithms, as described above, for translating the IP address to the conventional short or long mobile station identifier can be reduced to a single algorithm. This is evident from the fact that the IP address and mobile station identifier are related by simple arithmetic operations.

The setting of the mobile station identifier to the lower unique bits of the IP-address provides one commonly used software path to internal data records. As such, software within a node can run faster since there is only one code path to optimize. Moreover, the CPU is less loaded, which makes it possible for a node to handle more mobile stations.

The foregoing has described the principles, preferred embodiments and modes of operation of the present invention. However, the invention should not be construed as being limited to the particular embodiments discussed above. For example, while the example above involved the use of class C addresses, the invention is not so limited. The invention is also applicable to systems using class B addresses. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method for transmitting a packet from a mobile station to a host, the method comprising the steps of:
   assigning a unique Internet Protocol (IP) address and a short mobile station identifier to the mobile station
   transmitting the packet from the mobile station to a node, the packet comprising the short mobile station identifier;
   converting the short mobile station identifier in the packet to a source IP address by adding a first predetermined number of higher bits of the assigned unique IP address to the short mobile station identifier; and
   transmitting the converted packet from the node to the host, the converted packet comprising the source IP address.

2. The method of claim 1 wherein the first predetermined number is determined during configuration of the node.

3. The method of claim 1 wherein the short mobile station identifier relates to a second predetermined number of bits of the assigned unique IP address.

4. A system for transmitting a packet to a host, the system comprising:
   a mobile station for transmitting the packet, the packet comprising a short mobile station identifier; and
   a node for receiving the packet, assigning a unique Internet Protocol (IP) address and a short mobile station identifier to the mobile station, converting the short mobile station identifier in the packet to a source IP address by adding a first predetermined number of higher bits of the assigned unique IP address to the short mobile station identifier and transmitting the converted packet to the host, the converted packet comprising the source IP address.

5. The system of claim 4 wherein the first predetermined number is determined during configuration of the node.

6. The system of claim 4 wherein the short mobile station identifier relates to a second predetermined number of bits of the assigned unique IP address.

7. A method for transmitting a packet from a host to a mobile station, the method comprising the steps of:
   transmitting the packet from the host to a node, the packet comprising a destination Internet Protocol (IP) address including a first predetermined number of higher bits of a unique IP address assigned to the mobile station and a short mobile identifier assigned to the mobile station;
   converting the destination IP address in the packet to the short mobile station identifier by removing the first predetermined number of higher bits of the assigned unique IP address; and
   transmitting the converted packet from the node to the mobile station, the converted packet comprising the short mobile station identifier.

8. The method of claim 7 wherein the first predetermined number is determined during configuration of the node.

9. The method of claim 7 wherein the short mobile station identifier relates to a second predetermined number of bits of the assigned unique IP address.

10. A system for transmitting a packet to a mobile station, the system comprising:
    a host for transmitting the packet, the packet comprising a destination Internet Protocol (IP) address including a first predetermined number of higher bits of a unique IP address assigned to the mobile station and a short mobile identifier assigned to the mobile station; and
    a node for receiving the packet, converting the destination IP address in the packet to the short mobile station identifier by removing the first predetermined number of higher bits of the assigned unique IP address and transmitting the converted packet from the node to the mobile station, the converted packet comprising the short mobile station identifier.

11. The system of claim 10 wherein the first predetermined number is determined during configuration of the node.

12. The system of claim 10 wherein the short mobile station identifier relates to a second predetermined number of bits of the assigned unique IP address.

13. The system of claim 11 wherein the short mobile station identifier equals the second predetermined number of bits of the assigned unique IP address.

* * * * *